United States Patent [19]
Feliss et al.

[11] Patent Number: 4,486,798
[45] Date of Patent: Dec. 4, 1984

[54] SELF-CLEANING MAGNETIC HEAD AIR BEARING SLIDER AND METHOD

[75] Inventors: Norbert A. Feliss; Tim W. Lile, both of San Jose, Calif.

[73] Assignee: International Business Machines Corporation, Armonk, N.Y.

[21] Appl. No.: 431,405

[22] Filed: Sep. 30, 1982

Related U.S. Application Data

[63] Continuation-in-part of Ser. No. 257,064, Apr. 24, 1981, abandoned.

[51] Int. Cl.³ .................. G11B 5/60; G11B 15/64; G11B 17/32
[52] U.S. Cl. .................................................. 360/103
[58] Field of Search ............................. 360/102–103, 360/104–106, 122, 129

[56] References Cited

U.S. PATENT DOCUMENTS 3,525,987  8/1970  Muijderman et al. ............. 360/103
3,855,625  12/1974  Garnier et al. ..................... 360/103
4,212,044  7/1980  Plotto ................................. 360/103

FOREIGN PATENT DOCUMENTS 53-80206   7/1978  Japan ................................. 360/106
55-84077   6/1980  Japan ................................. 360/103
55-105858  8/1980  Japan ................................. 360/103
798978     1/1981  U.S.S.R. ............................ 360/103

Primary Examiner—John H. Wolff
Attorney, Agent, or Firm—Henry E. Otto, Jr.

[57] ABSTRACT

In a magnetic disk file, the longitudinal rails of an air-bearing head slider are skewed at a predetermined angle relative to a tangential velocity vector line that passes through a transducer tangent to the particular data track over which said transducer is then disposed for causing airborne debris particles that are drawn in under the rails to be directed in a path that substantially avoids said transducer to reduce wear thereof. This angle is sufficient to cause said debris particles to be dispersed into a viscous fluid stream that flows outboard of said tangential velocity vector line and said transducer.

6 Claims, 3 Drawing Figures

SELF-CLEANING MAGNETIC HEAD AIR BEARING SLIDER AND METHOD

CROSS REFERENCE TO RELATED APPLICATION

This is a continuation-in-part of application Ser. No. 257,064 filed Apr. 24, 1981 (abandoned concurrently with the filing hereof).

DESCRIPTION

1. Technical Field

This invention relates to magnetic disk files and more particularly to a means and method for rendering a magnetic head air bearing slider substantially self-cleaning to minimize the damaging effects of debris particles.

2. Background Art

A major problem found in disk file operation is the wear of magnetic heads caused by debris particles that are generated during disk file operations, by the mechanical effects of head accessing, disk rotation and vibration, for example.

The airborne particles are of minute size, in the range of 0.1–40 microns in diameter. As the disk file is used more and more, there is a significant increase in the amount of particle contaminants that are generated. As a result, the disk file experiences head crashes against the disk surfaces, which damage both the heads and disks and generate additional debris particles. Debris and head crashes may result in a loss of data, cause a reduction in reliability of the file, affect the integrity of the data being recorded and read out, and lead to possible machine failure.

Conventionally, air filters, critical air flow paths, and meticulously cleaned disk assembly parts are employed to eliminate the contaminants. However, these methods, which add to the cost of production and maintenance, reduce the amount of contaminants, but are not 100% effective.

U.S. Pat. No. 3,855,625 discloses a type of magnetic head air bearing slider in which such problems can be encountered. The head slider is formed with side rails with a recessed air therebetween, and one or more magnetic transducers are disposed at the trailing edge of the slider adjacent to the side rails. When positioned in a disk file in accordance with prior art practice, the slider rails are substantially parallel to the tangential velocity vector of the rotating disk. In such case, debris and contaminant particles appearing in the area of the slider will follow a wake pattern or path from the leading edge to the trailing edge of the slider with the high probability of severely impacting and damaging the transducer elements.

U.S. Pat. No. 4,212,044 describes a magnetic head slider comprising a plurality of auxiliary longitudinal skids (21) interposed between a pair of longitudinal rails or skids (20). The front face (26) of each auxiliary skid forms a diverter blade to force dust particles to at least one side of the skids to prevent them from collecting at the air gaps (15).

Japanese Patent 53-80206 (7/78) discloses a magnetic disk file in which the head support (2) moves translationally in a direction (7) parallel to a line (10) which it is at an angle $\theta$ to a line (9) drawn tangent to the disk radius in order to move the head to different tracks, analogous to a swing-arm type actuator except that the head is moved rectilinearly rather than arcuately.

Japanese Patent 55-105858 discloses a slider wherein flying height at the head is lowered by progressively decreasing the width of two longitudinal rails toward the trailing edge of the slider.

SUMMARY OF THE INVENTION

According to the present invention, a means and method are provided for rendering a magnetic head air bearing slider substantially self-cleaning by positioning the slider at a skew angle relative to a tangential velocity vector line that passes through the transducer tangent to the particular data track over which said transducer is then disposed for causing airborne debris particles that are drawn in under the rails to be directed in a path outboard of the tangential velocity vector line and transducer and thus substantially avoid said transducer to reduce wear thereof.

BRIEF DESCRIPTION OF THE DRAWINGS

The invention will be described in detail with reference to the drawings in which.

It should be understood that the different parts and elements are not depicted in realistic proportion, but some are shown enlarged for the purpose of explanation and visual clarity.

DESCRIPTION OF PREFERRED EMBODIMENT

Figure 1:
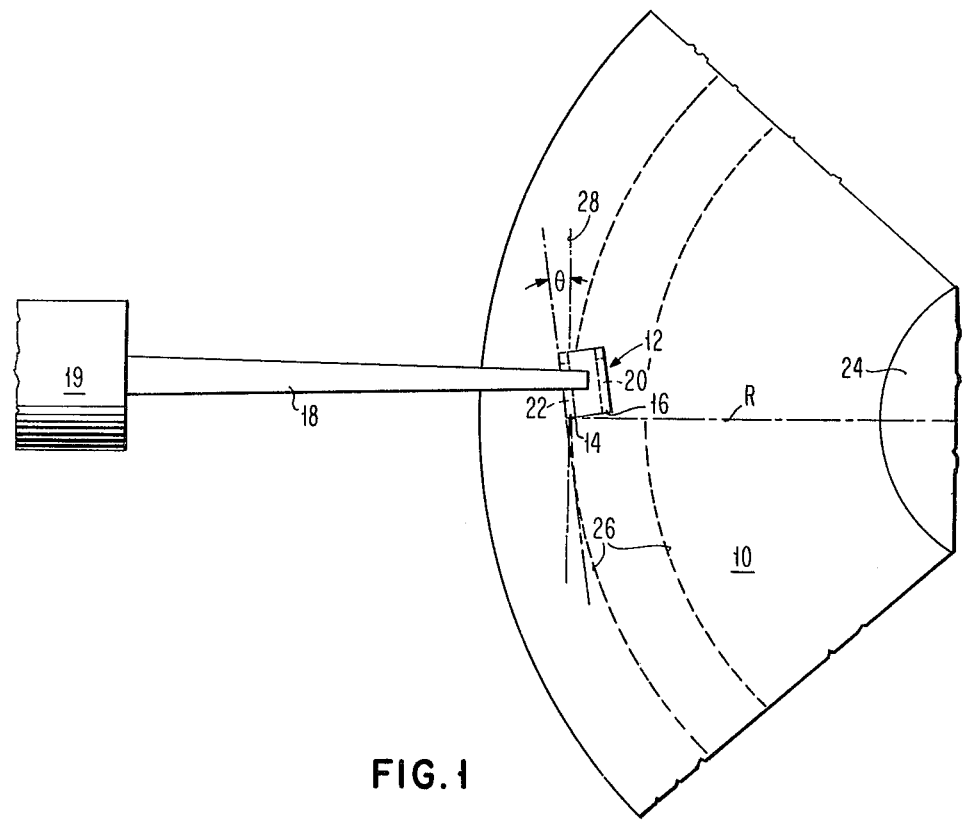
FIG. 1 is a plan view, partly broken away, illustrating the relation of a magnetic disk and magnetic head suspension and slider in a disk file made in accordance with this invention.

As shown in FIG. 1, a head/disk assembly embodying the invention includes a magnetic disk 10 and an air bearing magnetic head slider 12, having magnetic transducers 14 and 16 mounted at the trailing edge 15 of the slider in close transducing relation with the disk. The head slider 12 is mounted to an arm 18 that is attached to an actuator 19, such as a voice coil motor (partly shown), in a well-known manner. The head slider 12 is formed with inner and outer rails 20 and 22 respectively, bounding a recessed area, including positive and negative pressures regions, to provide a desired pressure distribution, so that a low load self-acting air bearing is provided. The inner rail 20 is defined as the one closer to the center of the disk, whereas the outer rail is that rail closer to the periphery of the disk. As illustrated, there are two transducers 14, 16, each preferably mounted at the trailing ends of the longitudinal rails 22, 20, respectively. By means of this slider configuration, a substantially constant spacing between the surface of the rotating disk 10 and the head slider 12 and its transducers 14, 16 is maintained. However, for purposes of illustration, only one of these transducers (namely, 14) is assumed to be connected so as to be active.

The magnetic disk 10 is mounted to a central rotary hub 24 for rotation relative to the accessing magnetic head assembly. As the disk rotates during the recording mode, bit positions along a selectable one of a plurality of substantially circular data tracks 26 on the disk surface are brought into registry with the preselected active transducer 14. These data tracks move at a velocity which is determined by the rotary speed of the rotary hub 24 driven by a motor (not shown). As earlier noted, the term "tangential velocity vector line" identifies a line, such as 28, which passes through the active transducers 14 and is tangent to the particular track 26 over which the transducer is then disposed. Note that transducer 14 is moved radially of disk 10 along radius R by the actuator 19 and that the axis of the actuator is offset slightly from, but parallel to, the radial path of the transducer.

Figure 2A:
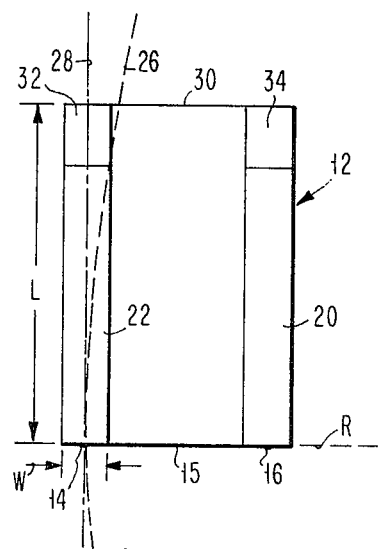
FIGS. 2A and 2B are enlarged schematic bottom views depicting the manner in which the magnetic head of a slider rail having the active transducer is positioned with respect to the tangential velocity vector line (hereinabove defined) according to the prior art and according to the present invention, respectively.

In prior art disk files, and as illustrated in FIG. 2A, debris particles that appear at the leading edge 30 of the slider adjacent to tapered portions 32, 34 are pushed into the disk surface under the leading edge of the slider, and are fractured into smaller particles. These reduced size particles are swept into a wake between the slider rails and the disk surface, and then impact the trailing edge of the slider, including the transducers 14, 16. With the slider rails 20, 22 thus parallel to the tangential velocity vector line 28, as shown in FIG. 2A, the transducers 14, 16 experience abrasion and undue wear.

Figure 2B:
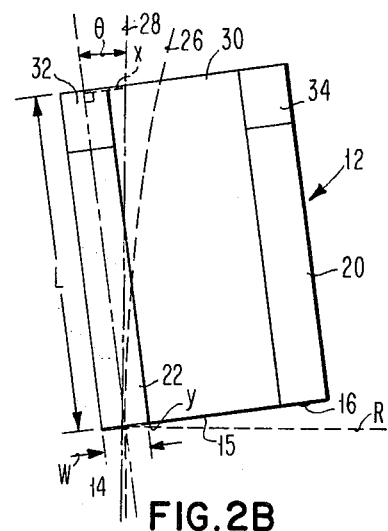

In accordance with the invention, and as illustrated in FIG. 2B, the slider 12 is positioned so that the rails are skewed at a predetermined angle $\theta$ relative to the tangential velocity vector line 28. The angle $\theta$ is a critical angle that is defined as $\theta = \tan^{-1}(x/L)$. Where, as illustrated in FIG. 2B, the active transducer 14 is centered at the trailing end of rail 22, x is somewhat more than $\frac{1}{2}W$ and less than or equal to W, where W is the width of the slider rail adjacent to the data track and L is the length of the head slider. Under these assumed conditions, an appropriate skew angle $\theta$ will be as shown in FIG. 2B. The skew angle obtained when $x = W$ is preferably not exceeded because there is no advantage in having the debris particles pass further outboard beyond the transducer 14.

Note that, if preferred, the skew angle $\theta$ can be decreased by positioning the transducer 14 closer to the inboard corner y of rail 22. This would allow some wear on the trailing edge rails but these wear marks would be displaced far enough away from the transducer to insure good read/write performance during the life of the disk file.

Note also that positioning the slider 12 at a skew angle, without any change in configuration, decreases the flying height of the slider since the effective air bearing area decreases. This may be desirable in some applications.

The skew angle $\theta$, as determined according to the above formula is preferably between 4° and 10° for a typical thin film head.

The skew may be achieved by bonding the slider body 12 to the arm 18 at the desired predetermined angle by means of epoxy. In those cases where an array of head sliders and arms are mounted in a comblike structure for transducing interaction with a stack of magnetic disks, such as shown in U.S. Pat. No. 4,190,870, the unitary arm structure may be skewed at the predetermined angle relative to the actuator which is movable linearly and radially relative to the disk surfaces. However, if preferred, the slider or said comblike structure may be disposed at right angles to the actuator axis, and the actuator disposed at the complement of skew angle $\theta$ relative to the tangential velocity vector line.

It will now be seen that skewing the head slider 12 and the slider rails 22, 20 relative to the tangential velocity vector line 28 of the disk track being written or read effectively eliminates particle contact and wear at the trailing edge of the slider where the transducers 14, 16 are disposed. Airborne particles greater than or equal to the average flying height of the head slider are trapped and fragmented by the leading edge taper of the slider. The wear debris is dispersed into the viscous fluid stream directly behind the taper and along the tangential velocity vector line 28, and away from and outboard of the trailing edge transducers. Moreover, skewing the head slider desirably reduces the necessary degree of efficiency required of the filter mechanism and permits use of components that may contain embedded particles, such as castings within the filtered enclosure that could damage the transducers. Morever, it will be apparent that the invention herein described can be implemented at minimal cost.

What is claimed is:

1. A magnetic disk file comprising:
   rotary magnetic disk means having circular data tracks registered thereon;
   a magnetic head slider including a pair of longitudinal rails and a transducer at the trailing end of one of the rails for interacting with said magnetic disk means in transducing relation;
   said rails being formed on the surface of said slider that faces said disk means for providing an air bearing surface; and
   said slider and rails being positioned at a predetermined skew angle relative to a tangential velocity vector line that passes through the transducer tangent to the particular data track over which said transducer is then disposed for causing airborne debris particles that are drawn in under the rails to be directed in a path that substantially avoids said transducer to reduce wear thereof.

2. A magnetic disk file as in claim 1, wherein said skew angle is sufficient to cause said debris particles to be dispersed into a viscous fluid stream that flows outboard of said tangential velocity vector line and said transducer.

3. A magnetic disk file as in claim 1, wherein said skew angle is $\theta = \tan^{-1}(x/L)$, where x is within a range from W to somewhat more than W/2, and W is the width of said one rail, and L is the length of said slider.

4. A magnetic disk file as in claim 1, wherein said skew angle is in the range of 4 to 10 degrees.

5. A magnetic disk file as in claim 1, wherein said transducer is substantially centered at the trailing edge of said slider, and x is substantially equal to W.

6. A method of minimizing wear caused to a magnetic transducer by debris particles that pass between a slider carrying the magnetic transducer and a rotating magnetic disk with which the transducer interacts in transducing relation, comprising the step of
   disposing the slider at a skew angle to the tangential velocity vector line that passes through the transducer tangent to the particular data track over which said transducer is then disposed,
   said angle being sufficient to cause said debris particles to be dispersed into a viscous fluid stream that flows outboard of said tangential velocity vector line and said transducer.

* * * * *